(12) United States Patent
Silver

(10) Patent No.: US 8,317,318 B2
(45) Date of Patent: Nov. 27, 2012

(54) SIDE ARM RELEASE SYSTEM FOR EYEGLASS FRAME WITH CHANGEABLE TEMPLE PIECES

(75) Inventor: Max A. Silver, Woodway, TX (US)

(73) Assignee: Silver Global Manufacturing LLC, Woodway, TX (US)

( * ) Notice: Subject to any disclaimer, the term of this patent is extended or adjusted under 35 U.S.C. 154(b) by 0 days.

(21) Appl. No.: 13/135,349

(22) Filed: Jul. 1, 2011

(65) Prior Publication Data
US 2012/0257159 A1    Oct. 11, 2012

Related U.S. Application Data

(63) Continuation-in-part of application No. 13/066,170, filed on Apr. 8, 2011.

(51) Int. Cl.
*G02C 5/14* (2006.01)
(52) U.S. Cl. .................. 351/116; 351/119
(58) Field of Classification Search .............. 351/116, 351/119, 111, 118, 110, 156
See application file for complete search history.

(56) References Cited

U.S. PATENT DOCUMENTS

| | | | |
|---|---|---|---|
| 3,582,192 A | 6/1971 | Gitlin | |
| 4,832,478 A | 5/1989 | Salce | |
| 5,007,728 A * | 4/1991 | Magorien | 351/118 |
| 5,185,620 A | 2/1993 | Cooper | |
| 5,321,442 A | 6/1994 | Albanese | |
| 5,473,395 A | 12/1995 | Huang | |
| 5,594,511 A * | 1/1997 | Lin | 351/116 |
| 5,652,635 A | 7/1997 | Kirschner | |
| 5,652,637 A * | 7/1997 | Marini | 351/116 |
| 7,137,700 B2 * | 11/2006 | DiChiara et al. | 351/90 |
| 7,261,410 B1 * | 8/2007 | Chen | 351/110 |

FOREIGN PATENT DOCUMENTS

WO    WO 2009/052705 A1    4/2009

OTHER PUBLICATIONS

International Search Report and Written Opinion of International Search Authority of Corresponding International Application No. PCT/US2011/001475.

* cited by examiner

*Primary Examiner* — Hung Dang
(74) *Attorney, Agent, or Firm* — Melvin K. Silverman

(57) ABSTRACT

A side arm for an eyeglass frame includes front frame having outer edges, each of the edges terminating in a vertical line parallel to a plane defined by the eyeglasses held within the front frame. The vertical line functions as a fulcrum for the release function. The system further includes a pair of axle journals, and a pair of male bayonet clips, each rotationally dependent at one end from axles within respective the journals of the eyeglass frame. Each of the temple pieces exhibit a forward end terminating in a vertical camming surface which contacts the fulcrum upon rotation of temple members. A pair of female bayonet clips are proportioned for complemental engagement of opposing male bayonet clips, the female clips formed integrally upon inner sides of each temple piece proximally to each of the male bayonet clips when the male clips are press-fitted into the female clips.

4 Claims, 8 Drawing Sheets

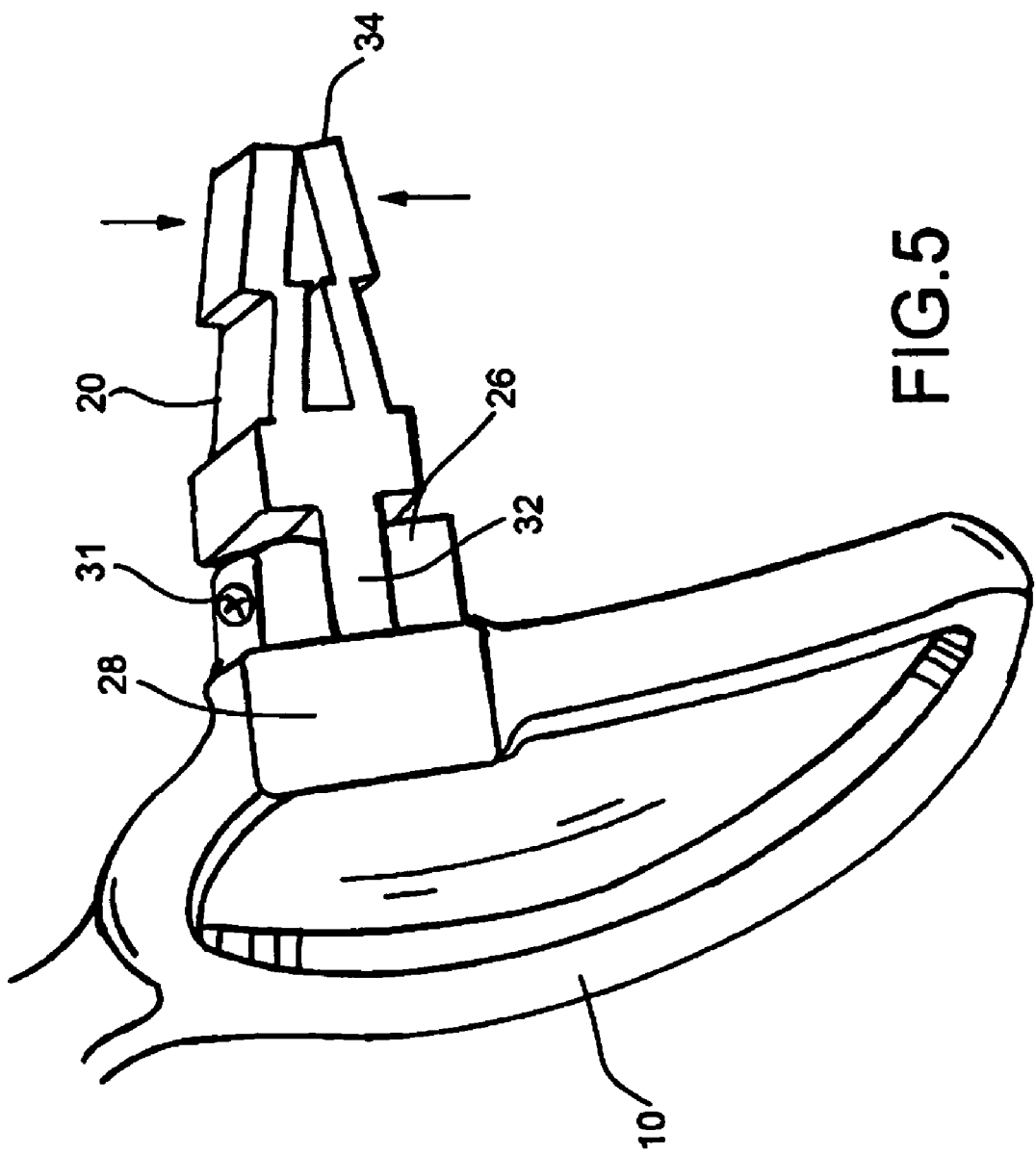

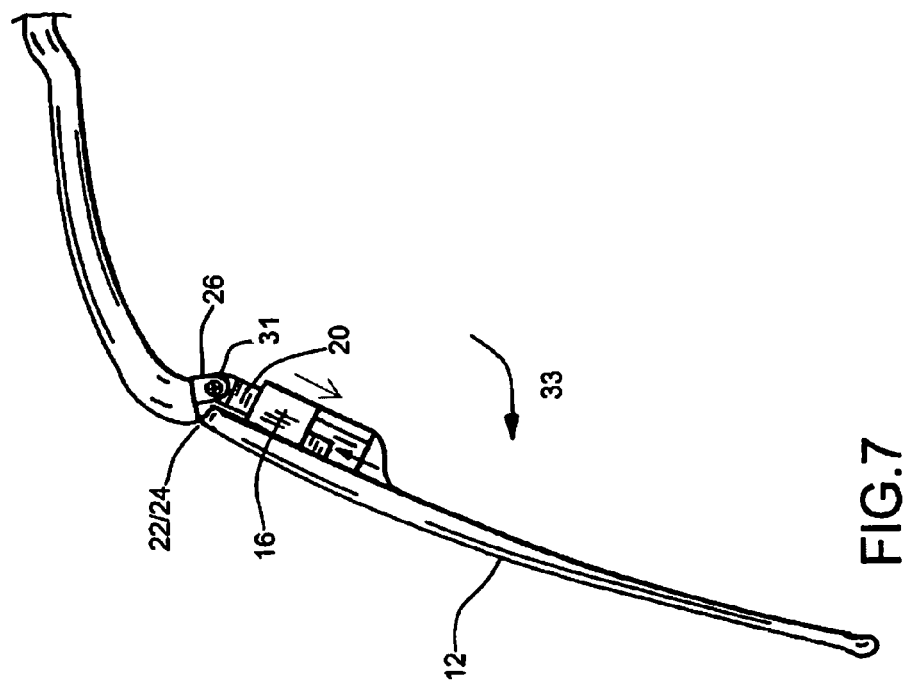
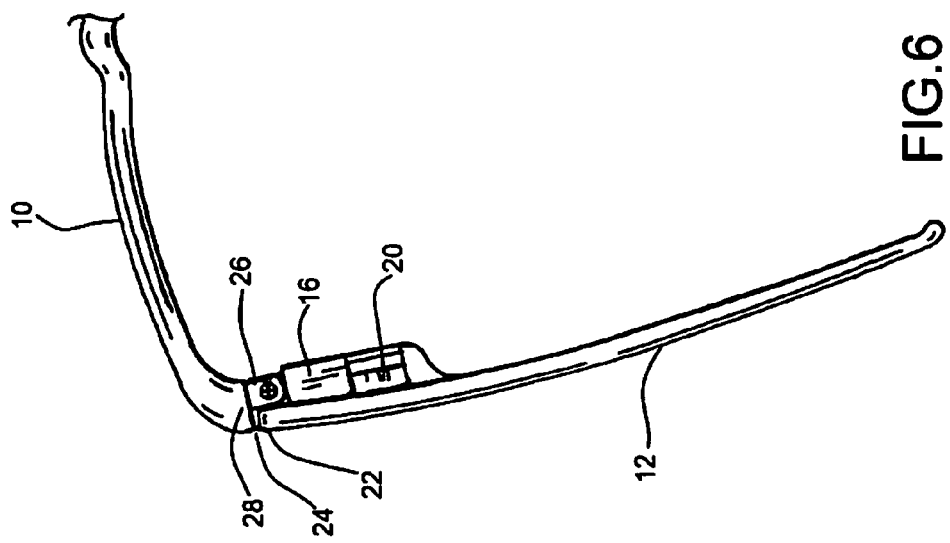
FIG. 7
FIG. 6

SIDE ARM RELEASE SYSTEM FOR EYEGLASS FRAME WITH CHANGEABLE TEMPLE PIECES

This application is a continuation-in-part of application Ser. No. 13/066,170, filed Apr. 8, 2011, and the same is incorporated herewith in its entirety.

TECHNICAL FIELD

This invention relates to eyeglass systems with selectably changeable side or temple pieces.

BACKGROUND OF THE INVENTION

Eyeglasses with temple pieces, the configuration, color or design of which can be changed have been suggested in the past. U.S. Pat. No. 5,321,442 (1994) to Albanese, entitled Eyeglasses with Detachable Lenses, Sidebars, and Adjustable Earpieces for example, discloses glasses with sidepieces that are removable including a sleeve which can be snapped onto or slipped from temple piece. Other concepts for the provision of an eyeglass or sunglass frame system with selectably changeable temple pieces are taught in U.S. Pat. No. 3,582,192 (1971) to Gitlin, entitled Detachable Decorative Sleeves for Spectacles; U.S. Pat. No. 5,185,620 (1993) to Cooper, entitled Eyeglass System; and U.S. Pat. No. 5,652,635 (1997) to Kirschner, entitled Decorative Sunglasses. Such art is also disclosed in PCT Publication WO/2009/052705 to Smart Vision Limited, entitled Glass Structure for Changeable Temple Sleeves. None of the above art however teaches a simple, cost-effective and durable solution to the long-felt need in the art for an eyeglass frame side arm release system capable of reaching the marketplace at a reasonable price point. The present invention accordingly responds to this long-felt need in the art.

SUMMARY OF THE INVENTION

The instant inventive side arm release system for an eyeglass frame and the like includes an eyeglass-securing front frame having left and right outer edges, each of the edges terminating in a substantially vertical line substantially parallel to a plane defined by the eyeglasses, sunglasses or the like held within the front frame. The vertical line defines a fulcrum for the release function of the system. The system further includes a pair of axle journals, one each of the journals of the pair integrally depending from the inner surface of each outer end of the front frame, the journal projecting in a direction generally normal to the plane of said eyeglasses or the like held within the front frame. Said journals are located proximally to said fulcrum within a dimension having a width of forward-most ends of side arms. The system further includes a pair of male bayonet clips, each rotationally dependent at one end thereof from axles within respective said axle journals of the eyeglass frame, and inwardly of said fulcrum in the direction of a nose bridge of the front frame. Each of said temple pieces exhibit a forward end terminating in a vertical camming surface which contacts said fulcrum upon rotation of said arms or temple members. A pair of female bayonet clips are proportioned for complemental engagement of opposing male bayonet clips, the female clips formed integrally upon inner sides of each temple piece proximally to each of the male bayonet clips when said male clips are press-fitted into the female clips. An extent of projection of each axle journal in a direction generally normal to the plane of the eyeglass frame defines a maximum degree of rotation of said camming surface against said fulcrum existing at the outer edges of said eyeglass frame. Consequently, the outward rotation of side or temple members of the system causes a lever action of said camming surface upon the fulcrum, thus pulling the female bayonet clip. Rotation of the eyeglass frame oppositely in direction to the rotation of said side arm will also pull said male bayonet clip out of engagement with its associated female clip and in the direction of said eyeglass frame.

It is accordingly an object of this invention to provide a novel eyeglass frame system having a special-purpose side joint and side arm release mechanism such that the temple pieces of the eyeglass frame system may be readily and cost-effectively changed to provide aesthetic appeal to the system and other associated advantages.

It is another object to provide a system of the above type which overcomes mechanical, durability, cost, and convenience-related limitations in the prior art of eyeglass frames having changeable temple elements.

It is a further object of the invention to provide an eyeglass frame system with temple pieces, the appearance of which may be readily changed by the simple and reliable manipulation of complemental elements associated by a hinge clip interface between the temple piece and the eyeglass frame.

The above and yet other objects and advantages of the present invention will become apparent to those skilled in the art in light of the following Brief Description of the Drawings, Detailed Description of the Invention, Drawings, and Claims appended herewith.

DETAILED DESCRIPTION OF THE DRAWINGS

FIG. 5 is a perspective elevational view showing a male bayonet clip in accordance with the invention and the method by which it is journalled to an outer edge of the eyeglass frame.

FIG. 6 is a schematic view showing the relationship between the operative elements of the present system after the male bayonet clip shown in FIG. 5 has been press-fit into the female element shown in FIG. 1, FIG. 7 also representing the normal condition of use of system when worn by a user.

FIG. 7 is a view sequential to FIG. 6, showing the rotation of a temple member at the beginning of the release function of the temple member.

DETAILED DESCRIPTION OF THE INVENTION

Figure 1:
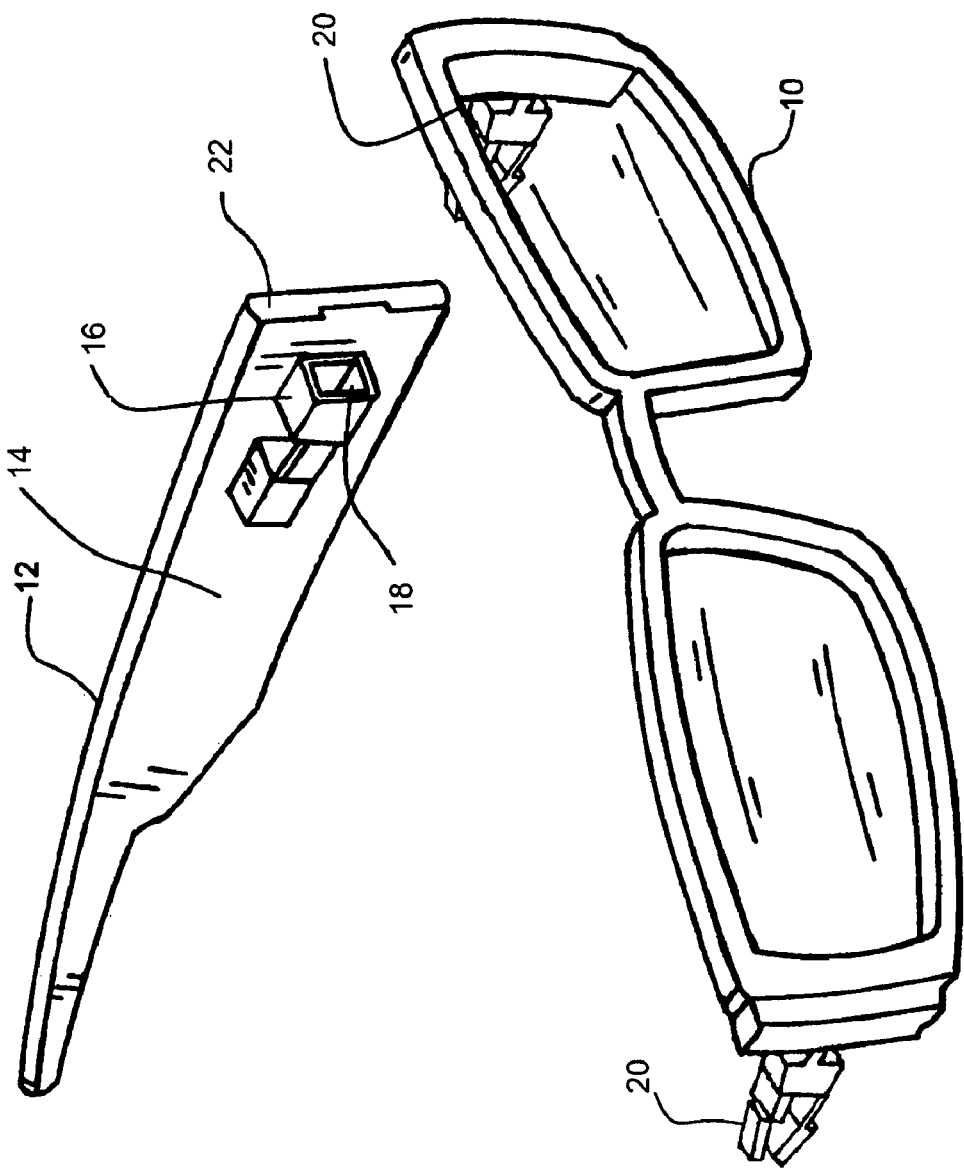
FIG. 1 is an exploded perspective view showing an eyeglass frame, temple members, and male and female bayonet clips associated with the present invention.
Figure 2:
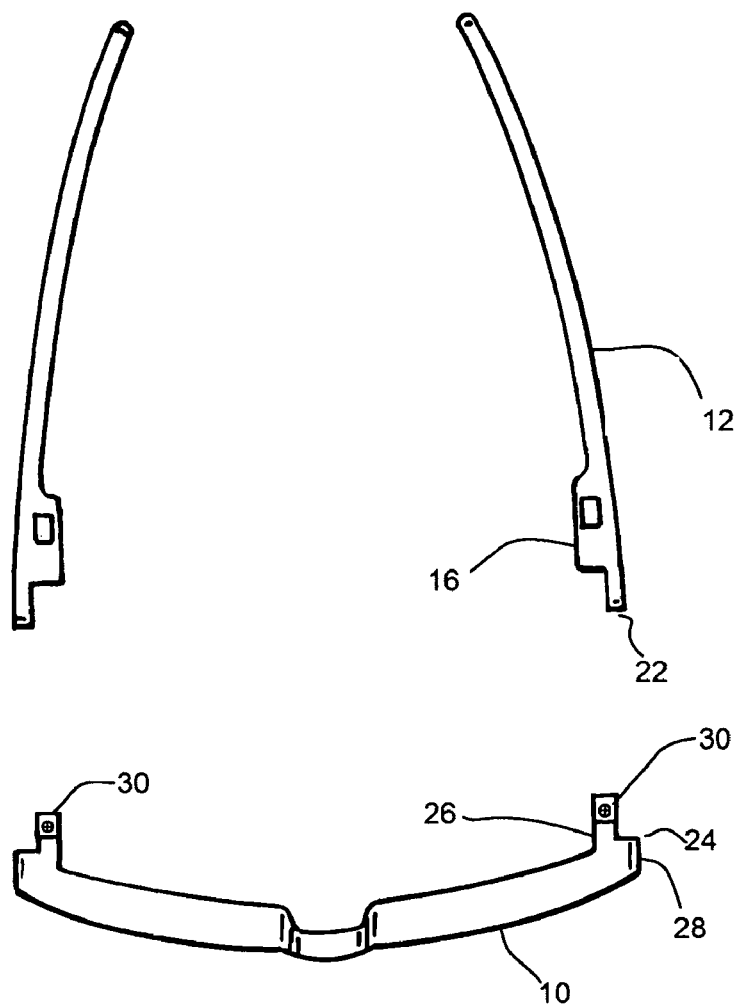
FIG. 2 is a top plan view of the illustration of FIG. 1.
Figure 3:
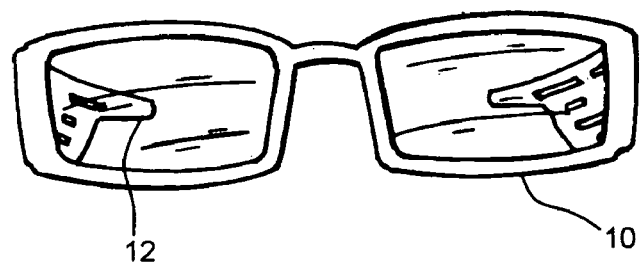
FIG. 3 is a front elevational view showing the system of FIGS. 1 and 2 when assembled.
Figure 4:
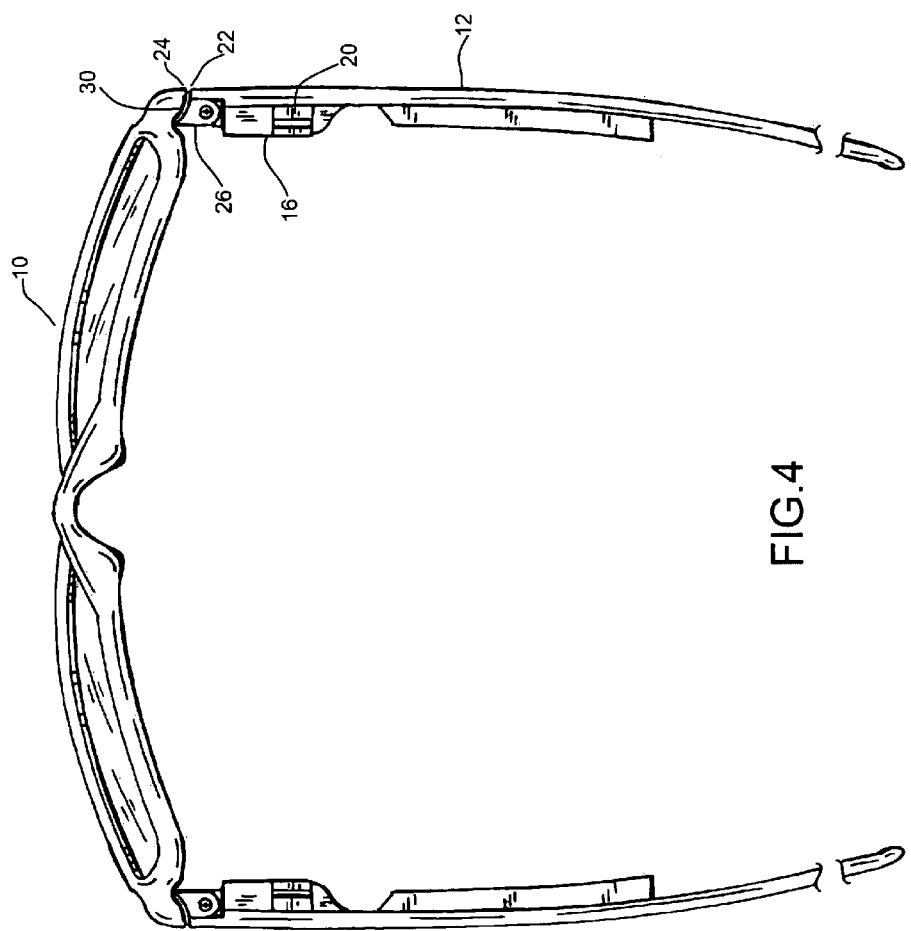
FIG. 4 is a bottom view of the system of FIG. 3.

With reference to the perspective exploded view of FIG. 1, there is shown an eyeglass frame 10 which includes side arms 12. As may be noted, each of the side arms also referred to herein as temple members possess an inner surface 14 on which are provided female bayonet clips 16 formed integrally with inner surface 14 of the temple members 12. Each female bayonet clip is characterized by a mouth or opening 18 which is proportioned for snap fit engagement of opposing male bayonet clips 20 shown in greater detail in the view of FIG. 5. Each temple member 12 includes a forward outer-most surface 22, more fully addressed below, shown in greater detail in the top view of FIG. 2. More particularly, outer-most surface 22, hereinafter also referred to as camming surface 22, is proportioned for complemental placement between a fulcrum 24 and journal 26 (see FIGS. 2 and 5) which project rearwardly in a direction away from eyeglass frame 10 and integrally from outer edges 28 at each side of the front frame 10 of the eyeless system. Therefore, when temple members 12 are secured to front frame 10 (see FIG. 7), region 30 (see FIGS. 2 and 4) will be occupied by forward surfaces 22 of temple members 12.

As may be noted in FIG. 5, each male bayonet clip 20 is rotationally repeatedly secured by an axle 31 which passes through a proximal end 32 (see FIG. 5) of axle journal 26, such that male bayonet clip 20 may rotate inwardly or outwardly upon axle 31. As may be seen in the bottom view of FIG. 4, each female bayonet clip 16 is attached, and typically integrally molded with temple member 16 however camming surface 22 of temple member 12 protrudes forwardly as may be noted in FIGS. 4 and 7.

Initially, to attach the side arms 14 to the eyeglass frame or front frame 10, each male bayonet clip 20 is, at its distal end 34, is urged into mouth 18 of female clips 16 (see FIGS. 1 and 5), the result of which is the structure shown in FIG. 6, wherein the male clip is fully engage within the female clip, thus facilitating the normal operational relationship between side arms 12 and front frame 10.

Figure 8:
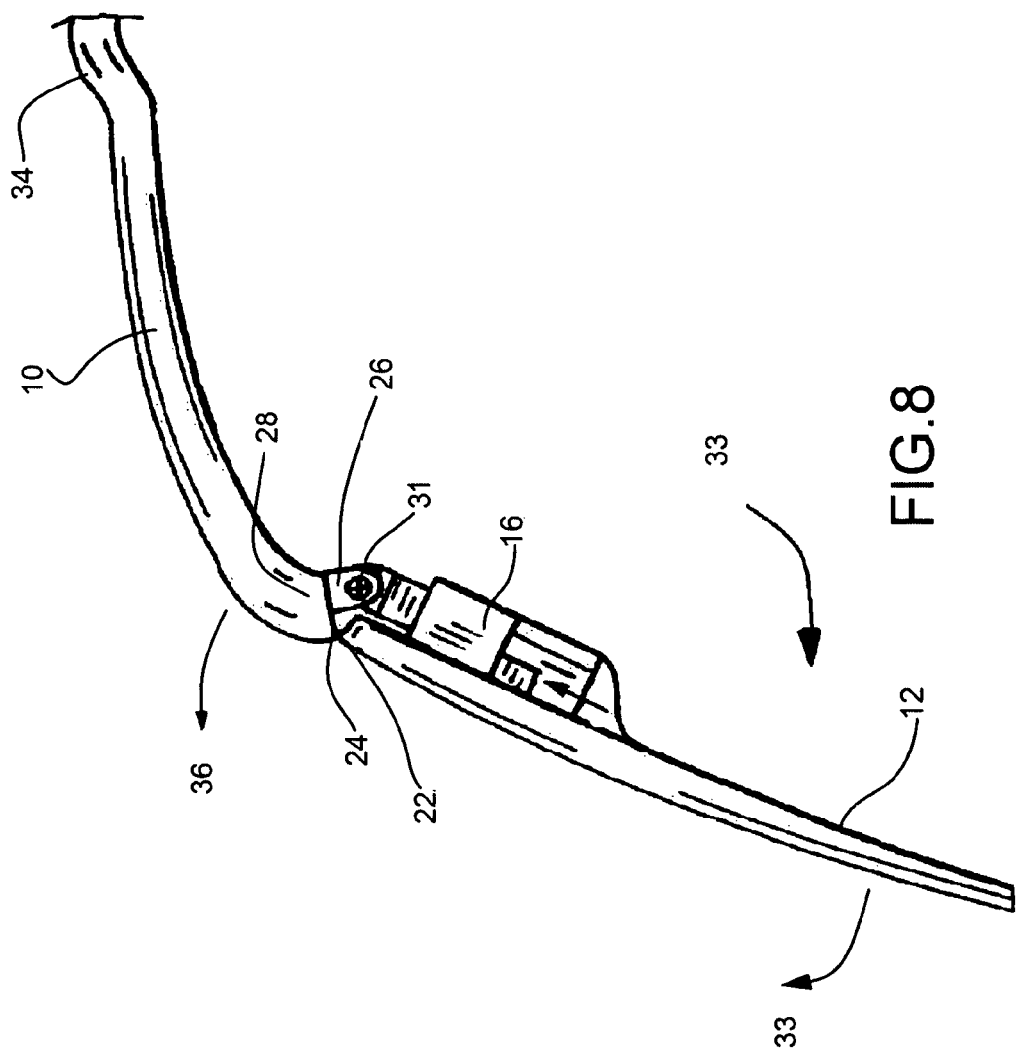
FIG. 8 is an enlarged view of the fulcrum function of FIG. 8.
Figure 9:
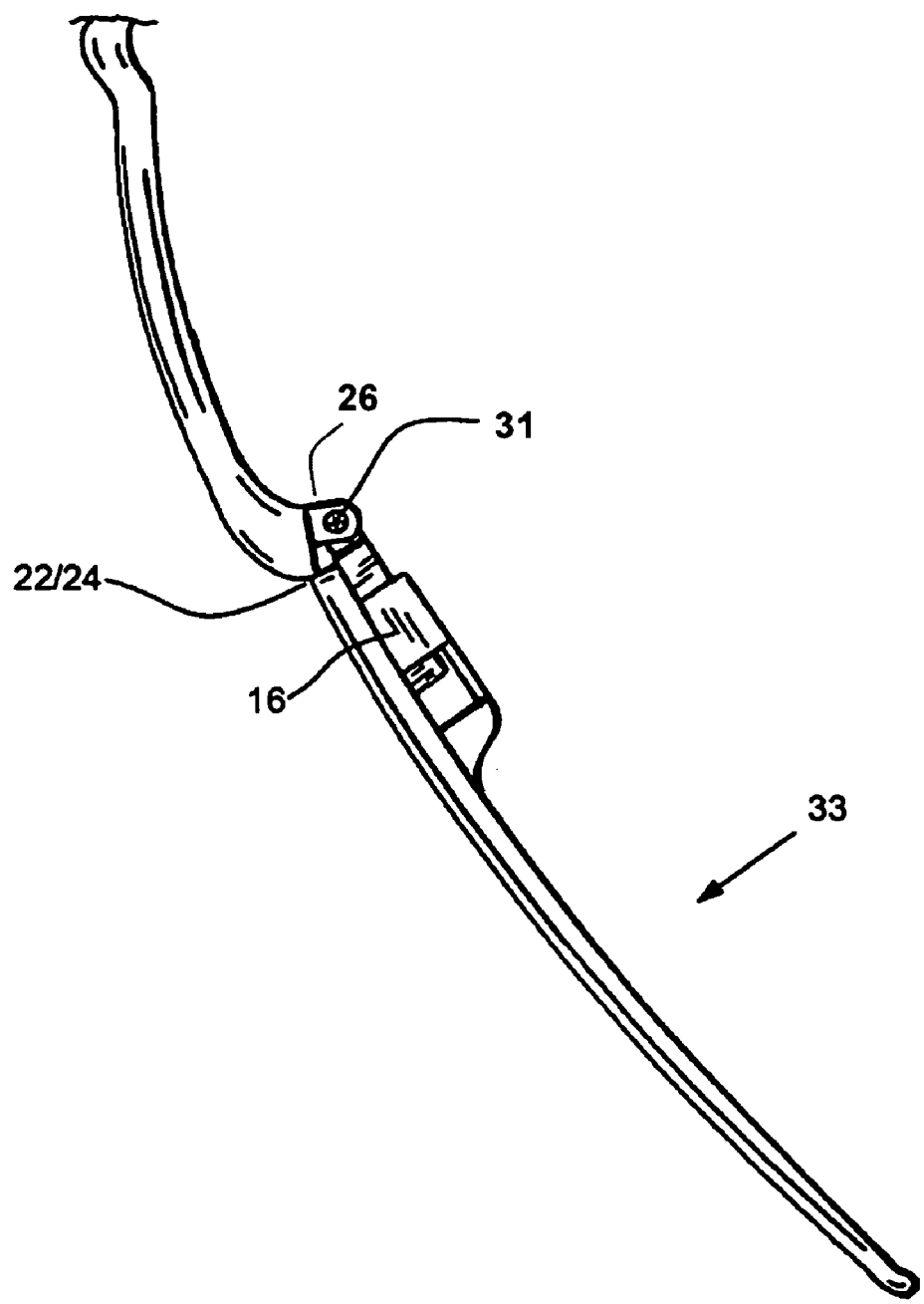
FIG. 9 illustrates a further degree of rotation of the temple member relative to the eyeglass frame and the contacting relationship between the fulcrum and camming surface of the side arm and the movement of the male and female bayonet clips relative to each other which occurs during this process.
Figure 10:
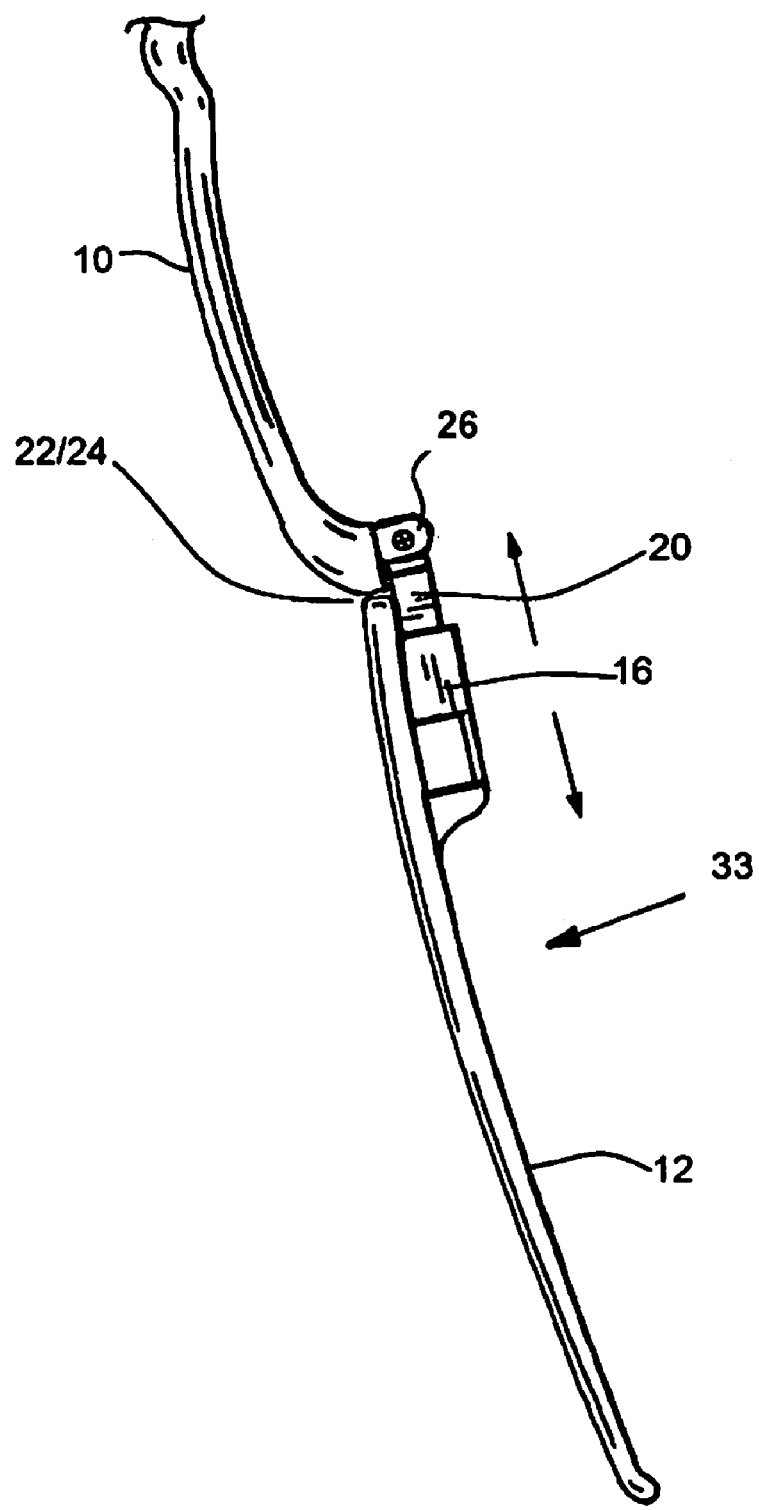
FIG. 10 is a view, sequential to that of FIG. 9 showing the complete removal of the male clip from the female clip and therein the temple frame at an angulation of about 180 degrees relative to the plane defined by the front frame of the system.

With reference to FIG. 7, there is shown the first step in accomplishing the disengagement of male clip 20 from female clip 16, that being the counterclockwise motion 33, (in the case of the left arm of the system) away from front frame 10 such that fulcrum 24 contacts camming surface 22 at the front of temple member 12. This action of camming surface 22 upon vertical line or fulcrum 24 will initiate the disengagement of the male and female bayonet clips 16 and 20 respectively from each other as proximal end 32 of the male clip 20 rotates upon axle 30 of axle journal 26. This is shown in enlarged view in FIG. 8, from which one may clearly seen that as arm 12 is rotated toward eyeglass portion 12 and/or as they are rotated toward each other, as indicated by arrow 36, the camming surface 22 at the end of side arm 12 will pivot against fulcrum 24 which is formed at the outermost line of outer edge 28 of the eyeglass frame. The continuation of this pivotal action is shown in the sequential views of FIGS. 9 and 10. Therefrom, as may be noted, male bayonet clip 26 is eventually pulled almost entirely out of female clip 16 such that the final removal of the temple member 12 and the eyeglass frame 10 may be manually accomplished. At this point, side member 12 defines an angle of about 180 degrees relative to the plane defined by the eyeglasses within the front frame 10. Thereafter, when a user of the present system has decided which new temple member one wishes to employ, a new temple member is simply inserted in the manner above-described. In other words, in the present system, every interchangeable temple member is formed with the female bayonet receiving element 16, having entrance or mouth 18 for the receipt of end 32 of the male bayonet clip 20 (See FIGS. 1 and 5).

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A side arm release system for an eyeglass frame, the system comprising:
    (a) an eyeglass securing front frame having left and right outer edges, an inner side of each of said edges terminating in a substantially vertical line substantially parallel with a plane defined by eyeglasses, sunglasses or the like held within said front frame, said vertical line defining a fulcrum;
    (b) a pair of axle journals, one each of the journals of each pair integrally depending from an inner surface of each outer end of said front frame, said journal projecting in a direction generally normal to said plane defined by eyeglasses or the like held within said front frame, said journals located proximally to said fulcrum within a dimension of about a width of forward ends of side arms attached to said eyeglass frame by an axle rotationally secured within said axle journals;
    (c) a pair of male bayonet clips, each rotationally dependent at one end thereof from axles of respective said axle journals of said eyeglass frame, and inwardly of said fulcrum line in the direction of a nose bridge of said eyeglass frame;
    (d) each of said side arms having a forward end terminating in a vertical camming surface, contacting said fulcrum upon rotation of said arms; and
    (e) a pair of female bayonet clips proportioned for complemental engagement about respective opposing male bayonet clips, said female clips formed integrally upon inner sides of each side arm proximally to each of said male bayonet clips when said male clips are pressed fitted into said female clips.

2. The system as recited in claim 1, in which an extent of projection of said axle journals in a direction generally normal to a plane of said eyeglass frames defines a maximum degree of possible rotation of said camming surface against said fulcrum of said left and right outer edges of said eyeglasses.

3. The system as recited in claim 2, in which outward rotation of a side arm of the system causes a lever action of said camming surface of the front of said side arm relative to said fulcrum of said ends of said eyeglass securing front frame, thereby pulling the female bayonet clip associated with its related side frame away from and out of engagement with its complemental male bayonet clip, while rotation of said front frame oppositely to said outward rotation of said side arm will pull said male bayonet clip out of engagement with the female clip and in the direction of said eyeglass frame.

4. The system as recited in claim 3, in which said within degree of rotation of each side arm relative to the eyeglass frame is 180 degrees.

* * * * *